United States Patent [19]

Yasukawa

[11] Patent Number: 5,422,702
[45] Date of Patent: Jun. 6, 1995

[54] TTL AUTO FLASH CONTROL DEVICE

[75] Inventor: Seiichi Yasukawa, Kawasaki, Japan

[73] Assignee: Nikon Corporation, Tokyo, Japan

[21] Appl. No.: 258,600

[22] Filed: Jun. 10, 1994

Related U.S. Application Data

[63] Continuation of Ser. No. 105,187, Aug. 12, 1993, abandoned.

[30] Foreign Application Priority Data

Aug. 18, 1992 [JP] Japan .................. 4-219093

[51] Int. Cl.⁶ .......................................... G03B 15/05
[52] U.S. Cl. ................... 354/415; 354/432
[58] Field of Search ............... 354/415, 430, 431, 432, 354/433, 132

[56] References Cited

U.S. PATENT DOCUMENTS

| | | | |
|---|---|---|---|
| 4,291,974 | 9/1981 | Silverberg | 355/76 |
| 5,164,759 | 11/1992 | Yasukawa | 354/415 |
| 5,168,300 | 12/1992 | Yasukawa | 354/415 |
| 5,172,157 | 12/1992 | Takagi | 354/415 |
| 5,221,941 | 6/1993 | Matsui et al. | 354/415 |
| 5,231,447 | 7/1993 | Takagi | 354/415 |
| 5,231,448 | 7/1993 | Sato et al. | 354/431 |
| 5,268,730 | 12/1993 | Takagi | 354/415 |

FOREIGN PATENT DOCUMENTS

| | | |
|---|---|---|
| 0103701 | 3/1984 | European Pat. Off. . |
| 0424987 | 5/1991 | European Pat. Off. . |
| 0464602 | 1/1992 | European Pat. Off. . |
| 0519499 | 12/1992 | European Pat. Off. . |
| 2170320 | 7/1986 | United Kingdom . |

OTHER PUBLICATIONS

Patent Abstracts of Japan, vol. 16, No. 247, (P-1365) 5 Jun. 1992 (JP-A-04 055 837).

*Primary Examiner*—Russell E. Adams
*Attorney, Agent, or Firm*—Shapiro and Shapiro

[57] ABSTRACT

This specification discloses a TTL auto flash control device for a camera capable of effecting TTL multiple-flash control in which preliminary flashing is effected before exposure and the quantity of flashlight of main flashing during exposure is controlled on the basis of the result of the detection of the reflected light distribution information of the object field. The device has means for measuring the time for which the integration of the object field light is effected while effecting the preliminary flashing, and immediately after the integrated value of the object field light resulting from the preliminary flashing is found, the preliminary flashing is not effected for the same time as the measured integration time, or a time obtained by the measured integration time being multiplied by a predetermined coefficient, to thereby integrate the object field light and find the integrated value of the object field light of only stationary light. A value obtained by the integrated value of the object field light of only the stationary light, or a value obtained by the aforementioned integrated value being divided by the predetermined coefficient, being subtracted from the integrated value of the object field light resulting from the preliminary flashing, is used as the object field reflected light distribution information by the flashlight of an electronic flashing device to determine the degree of weighting of each divided area during main flashing.

10 Claims, 9 Drawing Sheets

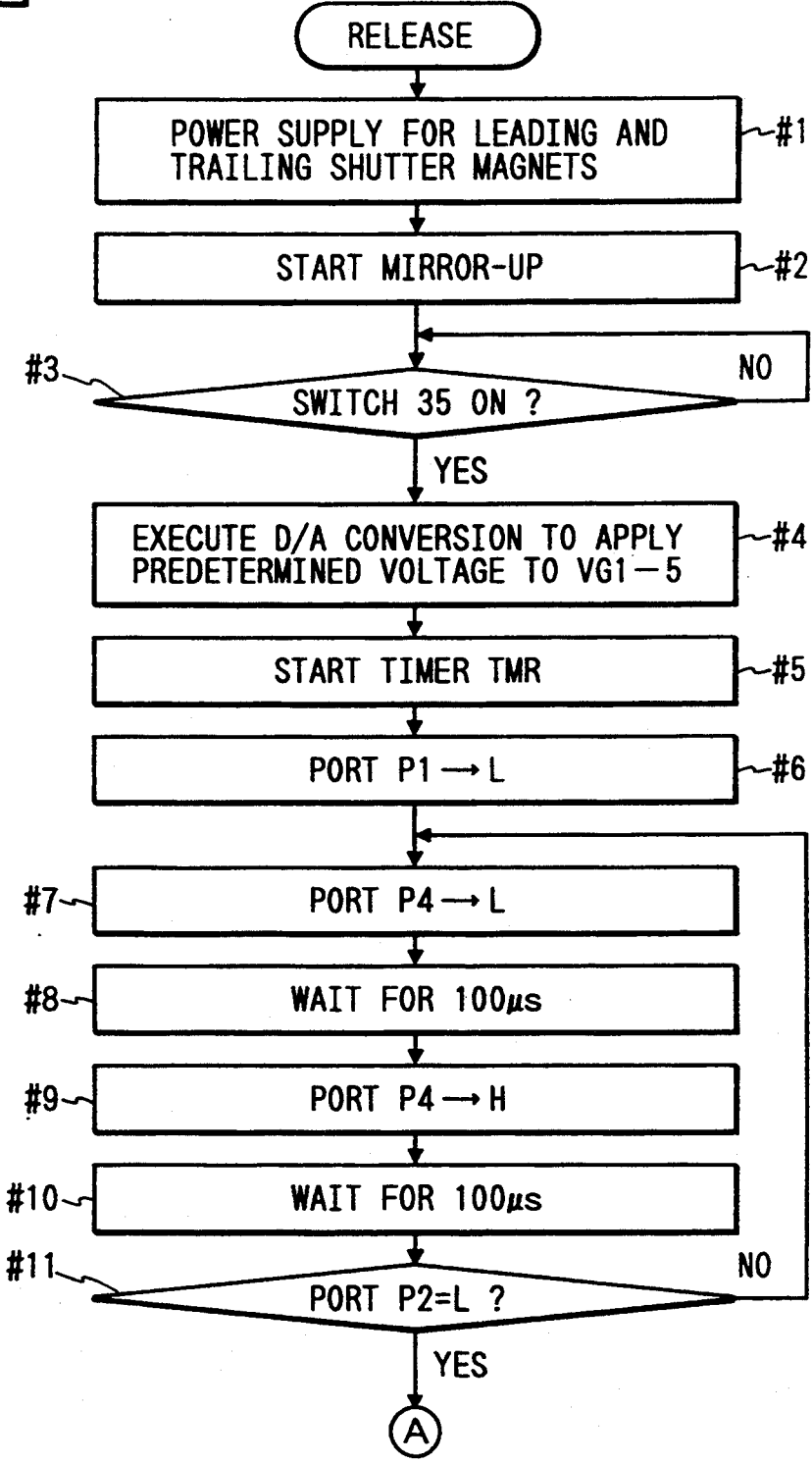

TTL AUTO FLASH CONTROL DEVICE

This is a continuation of application Ser. No. 08/105,187, filed Aug. 12, 1993, now abandoned.

BACKGROUND OF THE INVENTION

1. Field of the Invention

This invention relates to a TTL auto flash control device for a camera.

2. Related Background Art

So-called TTL auto flash control photographing in a camera provided with a flashing device or a camera having a flashing device mounted on the outside thereof is controlled as follows.

Immediately after a shutter is opened, the flashing of the flashing device is started, and light provided by reflected light from an object being reflected onto the surface of film through a photo-taking lens is caught by photoelectric converting means in a mirror box and is converted into an electrical signal with an amplification factor which is determined by film speed. The signal is integrated by a capacitor and the result is compared with a predetermined value, and at a point of time whereat the two become equal to each other, the flashing of the flashing device is stopped.

Also, the technique of "TTL multiple-flash control" which is a TTL auto flash control system further evolved in recent years is disclosed in U.S. application Ser. No. 560,745, filed by the applicant on Jul. 31, 1990, and the control thereof is effected as follows.

A plurality of photoelectric converting means capable of dividing the object field into a plurality of areas and photometering them are disposed at locations facing the surface of film, and immediately before a focal plane shutter is opened, a flashing device is caused effect preliminary flashing, and light provided by the object image by that flashlight being reflected by the surface of a shutter curtain is caught by the plurality of photoelectric converting means, and the outputs thereof are individually integrated and the results are detected as the object field reflected light distributions of the respective areas by flashing. The detected object field reflected light distribution information of each area is calculation-processed by a predetermined algorithm, whereby such a degree of weighting for each divided area that is optimum exposure to a main object is determined. Subsequently, immediately after the shutter is opened, the flashing device is caused to effect main flashing and the light reflected by the surface of the film is caught by the same plurality of photoelectric converting means as the aforementioned ones, and the weighting determined as described above is effected on the outputs thereof, whereafter the outputs are added together and integrated, and the flashing of the flashing device is stopped at a timing determined by the result of the integration being compared with a predetermined value, and the control of the main flashing is terminated.

The aforementioned preliminary flashing is for detecting the reflected light distribution information of the object field beforehand, and for judging whether each divided area is an area to which importance should be attached during the main flashing. Therefore, the control device needs to grasp the quantity of flashlight emitted as the preliminary flashing, and a concrete measure therefor is described in U.S. application Ser. No. 718,993, filed on Jun. 21, 1991, and this will hereinafter be described.

An electronic flashing device effects a shot of small quantity preliminary flashing whose quantity of light is pre-known when a preliminary flashing instruction signal is input thereto. The control device of a camera repetitively outputs a preliminary flashing instruction signal, and stops the preliminary flashing instructions at a point of time whereat the integrated output of each divided area reaches a suitable level. The control device of the camera counts the frequency of the preliminary flashing instructions, and finds the total quantity of flashlight during the preliminary flashing from the counted frequency and the pre-known quantity of preliminary flashing per shot.

Now, the preliminary flashing by the above-mentioned repetitive flashing lasts for a considerably long time, e.g. of the order of 3 ms because depending on the situation of the object field, the frequency becomes great and the time interval between the cycles of flashing cannot be made shorter than a predetermined time due to the circumstances of the circuit of the electronic flashing device. The control device of the camera continues to integrate the quantity of light received from the object light for this total preliminary flashing time and thus, integrates not only the reflected light of the object of the flash illumination of the electronic flashing device, but also the object field light by stationary light illumination of the sum or the like at a time, and the more intense is the stationary light component, the farther becomes the result of the integration from the object field reflected light information by the flashlight.

A device for eliminating such a stationary light component from the result of the integration is disclosed in U.S. Pat. No. 4,291,974. In this device, however, preliminary flashing is effected by a predetermined amount within a predetermined period and therefore, when there is a high luminance object or a high reflectance object in the object field, there axises a problem that the actual quantity of integrated light exceeds a measurable upper or lower limit value, and when it is desired to make the period till the photographing operation succeeding to the preliminary flashing as short as possible, there arises a problem of operability that control cannot be done well.

SUMMARY OF THE INVENTION

It is the object of the present invention to provide a TTL auto flash control device which is highly accurate and excellent in operability when an electronic flashing device is caused to effect preliminary flashing to thereby detect the state of the object field.

To achieve the above object, according to the present invention, provision is made of means for measuring the time for which the integration of the object field light has been effected while causing preliminary flashing to be effected, and immediately after the integrated value of the object field light resulting from the preliminary flashing is found, the preliminary flashing is not effected for the same time as said measured integration time, or for the measured integration time multiplied by a predetermined coefficient, and the object field light is integrated to thereby find the integrated value of the object field light of only stationary light. From the integrated value of the object field light resulting from said preliminary flashing, the integrated value of the object field light of only said stationary light, or a value obtained by subtracting said integrated value divided by said predetermined coefficient is used as the object field reflected light distribution information by the flashing of the electronic flashing device to determine the degree of weighting of each divided area during main flashing.

In the present invention, when detecting the object field reflected light distribution information by the preliminary flashing necessary for TTL multiple-flash control, what has been integrated without the preliminary flashing for the same time as the time required for the preliminary flashing, or for the time related by the predetermined coefficient is used to cancel the stationary light component and therefore, it becomes possible to grasp the object field reflected light distribution information by the flashing illumination of the electronic flashing device as an amount purely by the contribution of only the flashing illumination. Accordingly, the weighting of each divided area during main flashing effected for the subsequent actual photographing can be made more accurate and thus, flash control accuracy can be enhanced.

DESCRIPTION OF THE PREFERRED EMBODIMENT

Figure 1:
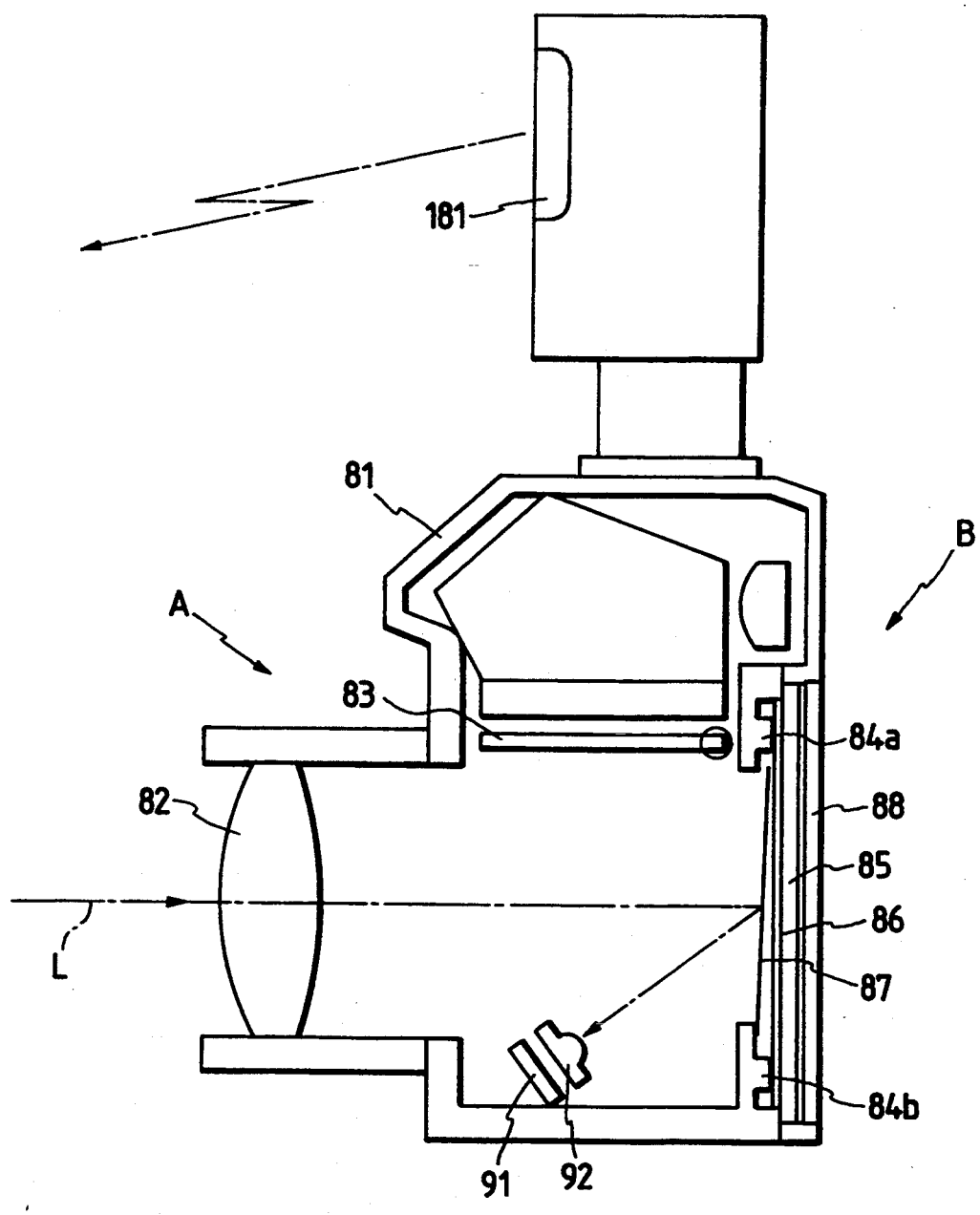
FIG. 1 is a cross-sectional view showing the structure of a camera according to an embodiment of the present invention.

FIG. 1 is a cross-sectional view of a camera for showing the optical disposition of photoelectric converting means in an embodiment of the present invention. In a camera body 81 having a flashing device 89 contained therein, inner rails 84a and 84b and a pressing plate 85 fix film 86 at a location whereat a light beam passed through a photo-taking lens 82 in the state of FIG. 1 in which a movable mirror 83 is retracted is imaged. The leading curtain 87 of a focal plane shutter is just in front of the film 86 in order not to permit the exposure of the film 86 except during photographing and intercepts the light. During exposure, i.e., when the leading shutter curtain 87 is in its retracted state, the light beam L from an object is refracted by the photo-taking lens 82 and is imaged on the surface of the film 86, and a part of the light beam is reflected and arrives at a condensing lens 92 and photoelectric converting means 91. When exposure is not going on, that is, when the leading shutter curtain 87 is in the position of FIG. 1, the light beam L from the object is refracted by the photo-taking lens 82 and is substantially imaged on the surface of the leading shutter curtain 87, and a part of the light beam is reflected and also arrives at the condensing lens 92 and the photoelectric converting means 91.

Figure 2:
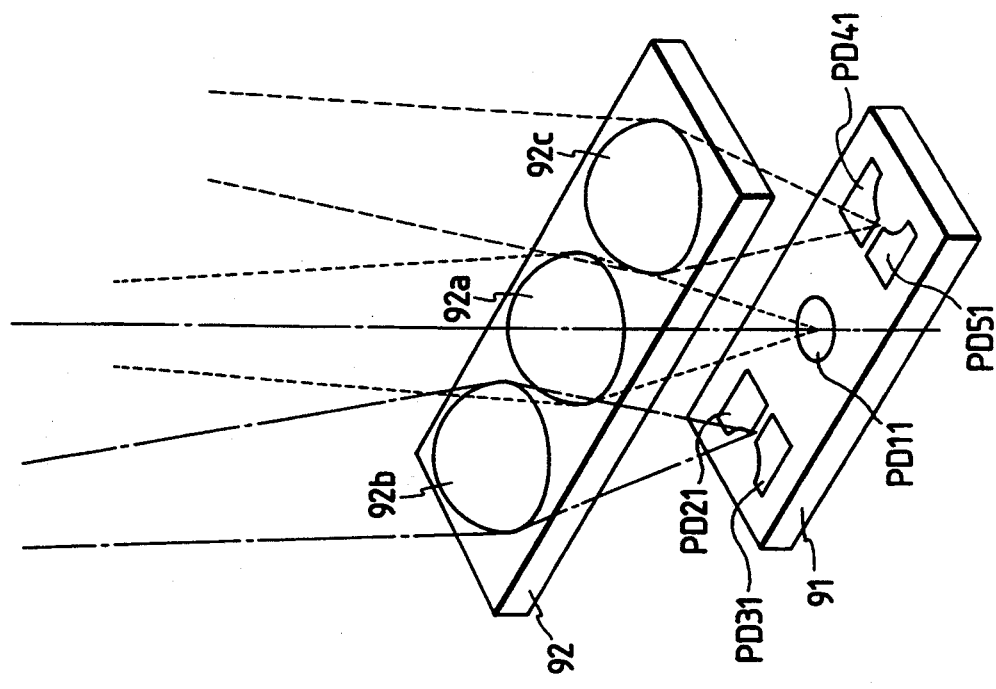
FIG. 2 is a perspective view showing the details of portions of the photometry optical system of the embodiment of the present invention.

FIG. 2 shows the structure of the photoelectric converting means 91 and the condensing lens 92. The photoelectric converting means 91 has on the same surface thereof a circular light receiving area PD11 and light receiving areas PD21, PD31 and PD41, PD51 of a shape provided by a rectangle cutaway by an arc and disposed at the opposite sides of the circular light receiving area PD11. The condensing lens 92 is an optical member having three lens portions 92a, 92b and 92c corresponding to the three blocks of the light receiving areas.

Figure 3:
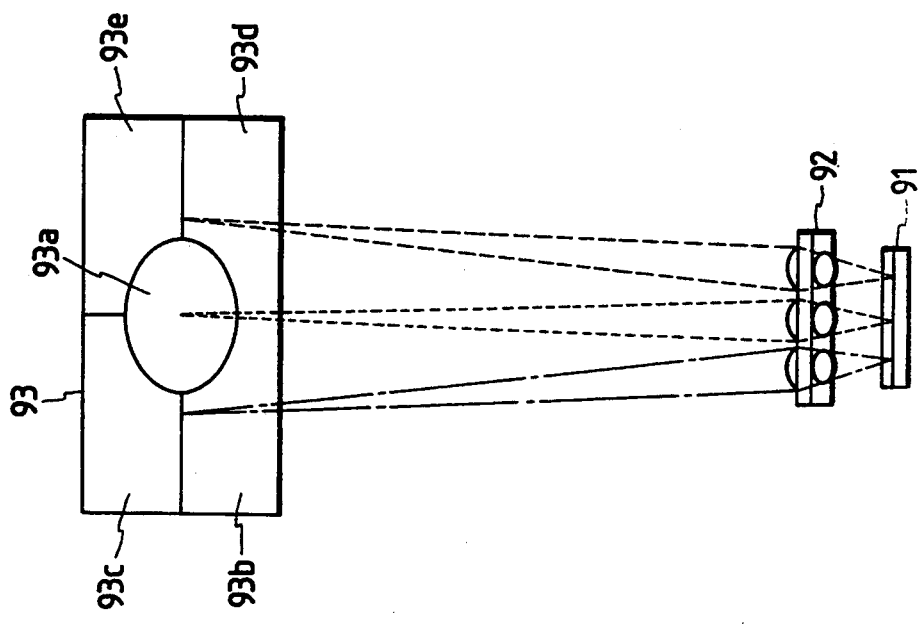
FIG. 3 is a conceptional view showing the photometry optical system of the embodiment of the present invention.

FIG. 3 is a view showing the positional relations among the opening area 93 of the surface of the film and the photoelectric converting means 91 and the condensing lens 92 as they are seen in the direction of arrow A of FIG. 1. Assuming that the opening area 93 of the surface of the film is divided into five areas, i.e., a central circular portion 93a and marginal four portions 93b, 93c, 93d and 93e, the three central, left and right blocks comprising the five light receiving areas of the photoelectric converting means shown in FIG. 2 face the central, left half and right half portions, respectively, of the opening portion of the surface of the film via the three lens portions of the condensing lens, as indicated by fine broken lines, dot-and-dash lines and rough broken lines, respectively, and they are substantially imaged. Further, the five light receiving areas PD11, PD21, PD31, PD41 and PD51 of the photoelectric converting means 91 of FIG. 2 are made coincident in shape with the areas 93a, 93b, 93c, 93d and 93e, respectively, of the opening portion of the surface of the film of FIG. 3 and therefore, this photoelectric converting means divisionally photometers the brightness of the five areas.

Figure 4:
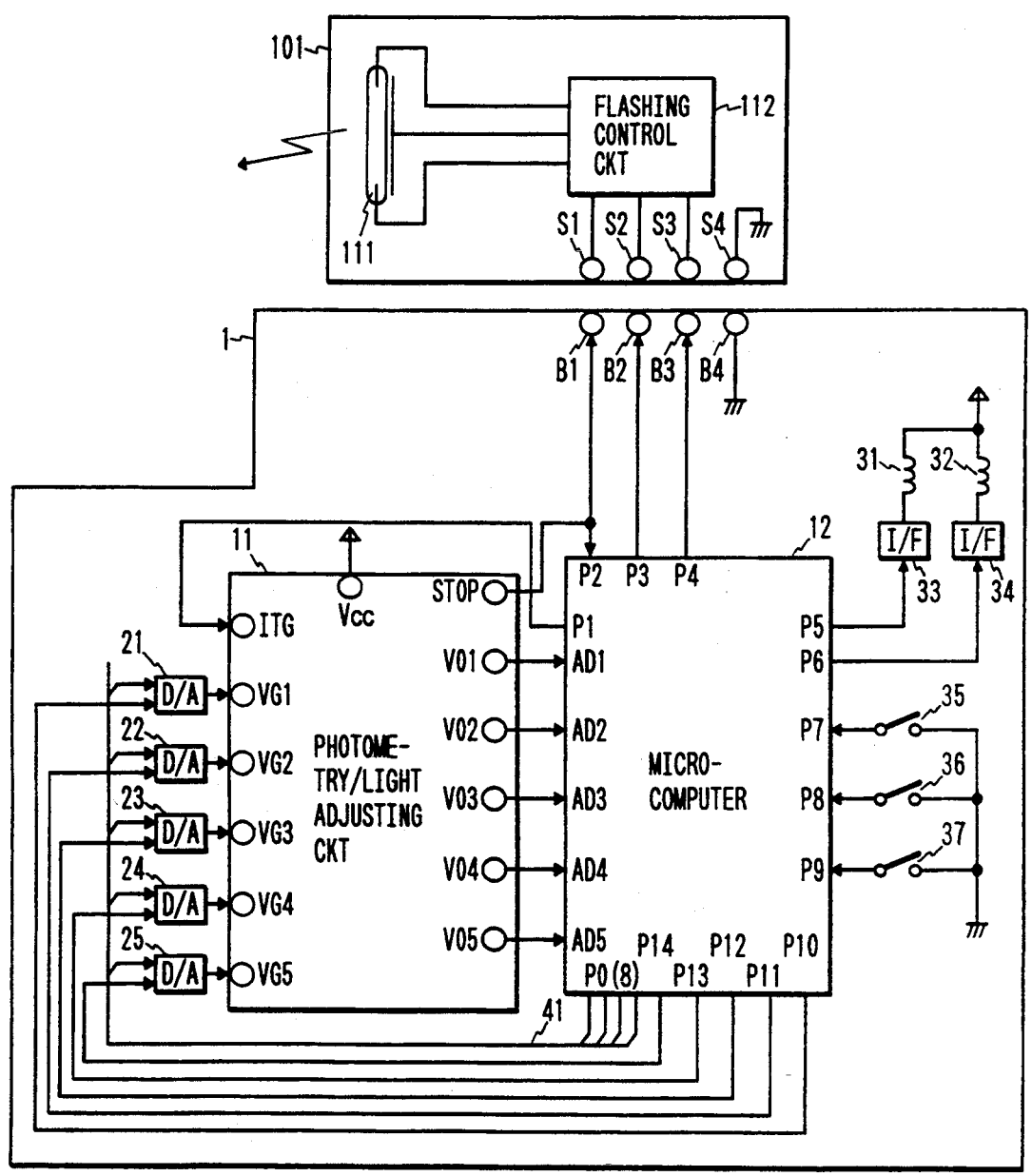
FIG. 4 is a block diagram showing the construction of the embodiment of the present invention.

FIG. 4 is a block diagram showing the circuit construction of the embodiment of the present invention.

The camera 1 is constructed as follows.

Figure 5:
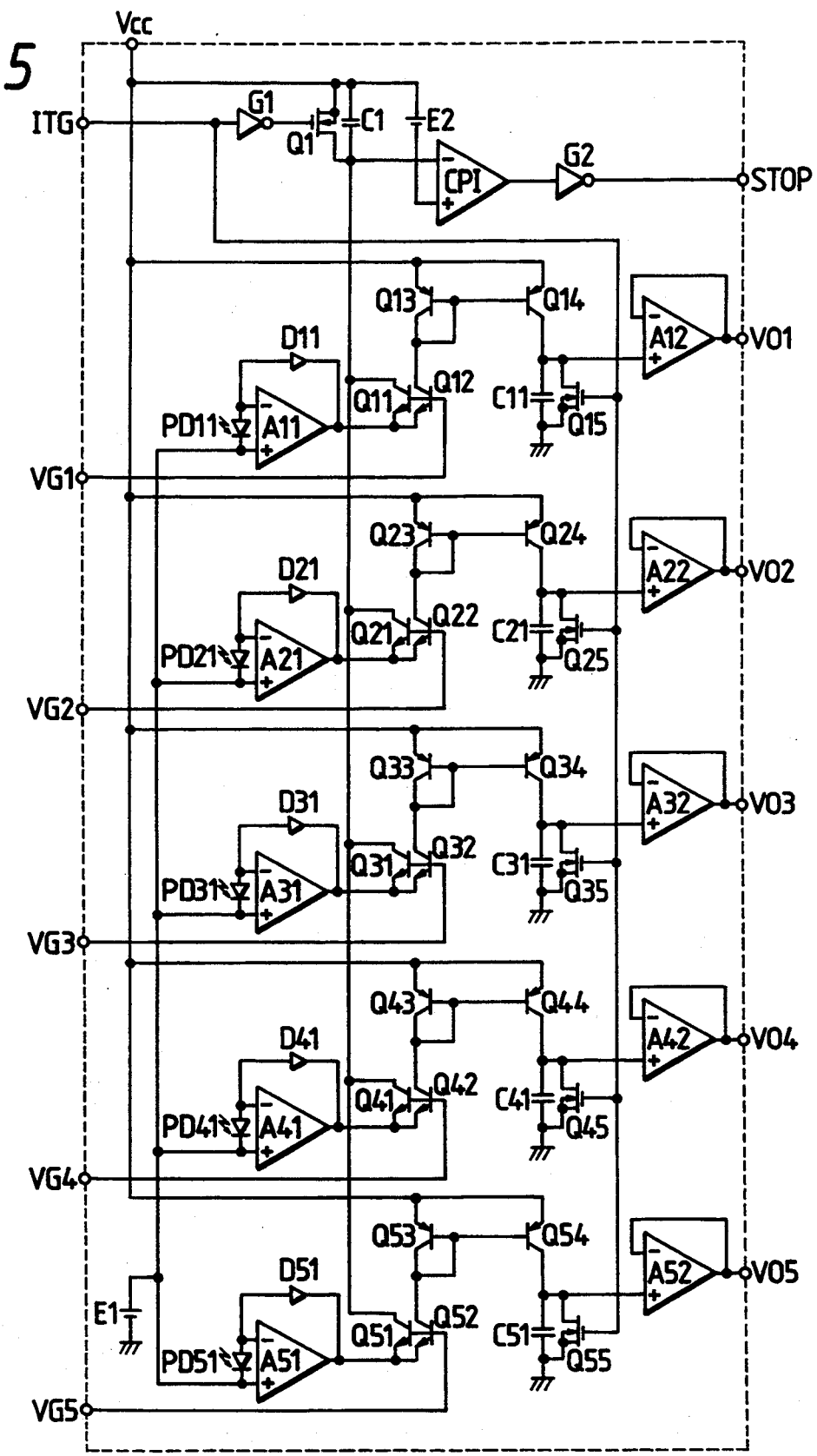
FIG. 5 is a circuit diagram showing the internal construction of the photometry and flash control circuit of the embodiment of the present invention.

A photometry/light adjusting circuit 11 has its internal circuit diagram shown in FIG. 5, but the construction thereof will first be described. Five photodiodes PD11–PD51 are the photoelectric converting means divided into five areas as shown in FIG. 2, and output photocurrents proportional to illuminances. The photocurrent output from PD11 is converted into a voltage output having a reference voltage source E1 as the reference which is logarithmically compressed by an operational amplifier A11 having the feedback of a diode D11 applied thereto. Transistors Q11 and Q12 use this voltage as their emitter potential and an input voltage from a gain setting input terminal VG1 as their base potential, and output a collector current logarithmically expanded by a gain determined by the difference between these potentials. The collector current of the transistor Q12 is reversed by current mirror circuits Q13 and Q14 and charges a capacitor C11. The voltage charged in the capacitor C11 is output to an integration voltage output terminal V01 through a follower amplifier A12. FETQ15 receives the signal of an integration control signal input terminal ITG and discharges all the charges collected in the capacitor C11. These operations also hold true of the other four photometry circuits of which the outputs are V02–V05. On the other hand, the collector currents of five transistors Q11–Q51 are added together and charge a capacitor C1. The voltage charged in this capacitor C1 is compared with a reference voltage E2 by a comparator CP1, and when the relation therebetween is reversed, the output of the comparator CP1 is reversed from L to H, and an output terminal STOP turns from H to L. FETQ1 receives a signal from the integration control signal input terminal ITG and discharges all the charges collected in the capacitor C1.

A microcomputer 12 causes D/A converters 21–25 to set independent voltages by selection signals output from the five terminals of output ports P10–P14 while outputting data from an output port P0(8) of 8 bits to the D/A converters 21–25 through a data bus 41. The output voltages of the D/A converters 21–25 are input to the gain setting input terminals VG1–VG5, respectively, of the photometry/light adjusting circuit 11. The five integration voltage output terminals V01–V05 of the photometry/light adjusting circuit 11 are connected to the A/D conversion input terminals AD1–AD5, respectively, of the microcomputer 12. An output port P1 is connected to the integration control signal input terminal ITG. The STOP terminal of the photometry/light adjusting circuit 11 outputs a signal to a contact B1 and also inputs a signal to the input port P2 of the microcomputer. An output port P3 outputs a main flashing starting signal for the electronic flashing device to a contact B2. An output port P4 outputs a preliminary flashing starting signal for the electronic flashing device to a contact B3. The reference numerals 35 and 36 designate mechanical switches movable on a driving sequence, the switch 35 being a mirror-up switch adapted to be closed upon completion of mirror up, and the switch 36 being a synchro switch adapted to be closed when the shutter is fully open. The reference numeral 37 denotes a release starting switch adapted to be closed when the photographer depresses a shutter release button. The signals of these three switches are connected to the input ports P7–P9, respectively, with pull-up resistances of the microcomputer 12. The reference numerals 31 and 32 designate magnets for holding the restraint of the leading curtain and the trailing curtain, respectively, and the driving thereof is controlled by the signals from the output ports P5 and P6 of the microcomputer 12 being passed through interfaces 33 and 34, respectively. A contact B4 is a contact for GND.

The electronic flashing device 101 is connected to the contacts B1–B4 of the camera 1 by contacts S1–S4, respectively. The contacts S1–S3 are input to a flashing control circuit 112. The flashing control circuit 112 has a booster circuit, a main capacitor, a flashing control IGBT, etc., all not shown, and effects predetermined electrical output control to the two discharge terminals and trigger terminal of a flashing portion 111 to control the start and stoppage of main flashing and the start and stoppage of preliminary flashing.

The operation of the present embodiment will now be described with reference to the timing chart of FIG. 6 and the flow chart of FIGS. 7A and 7B.

Figure 6:
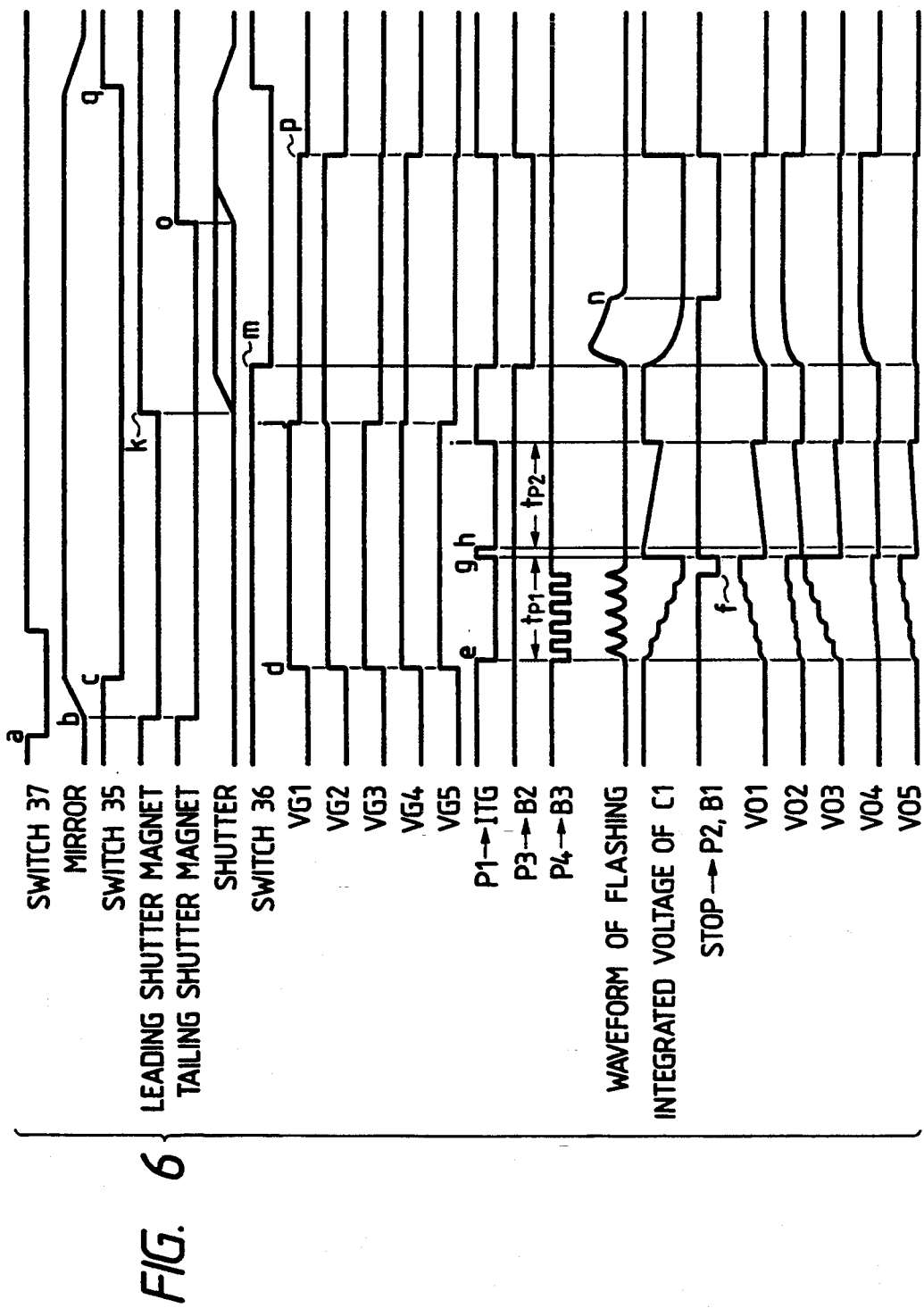
FIG. 6 is a timing chart showing the operation of the embodiment of the present invention.
Figure 7B:
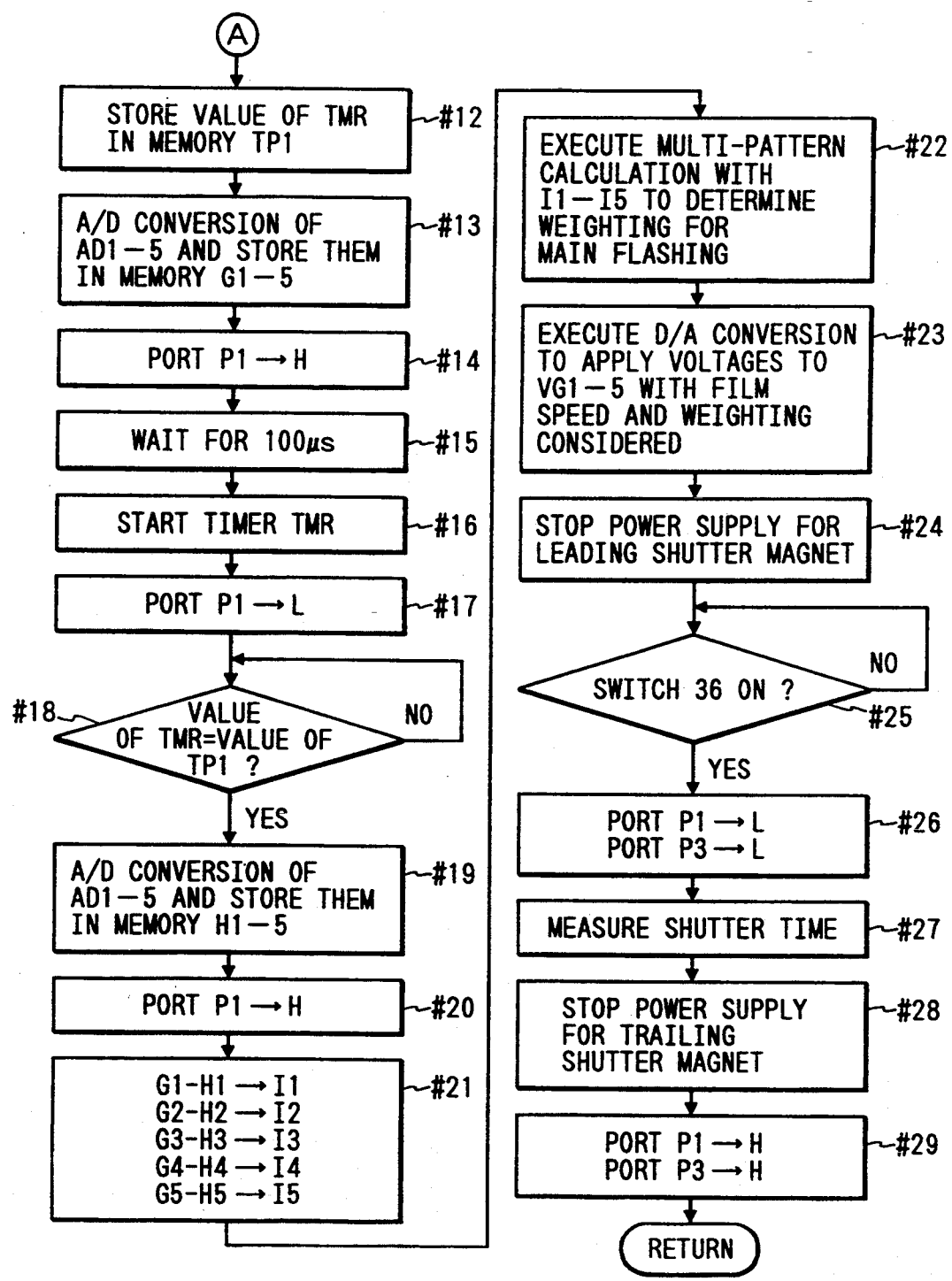
FIG. 7 is comprised of FIG. 7A and FIG. 7B showing flow charts showing the operation of the embodiment of the present invention.

The microcomputer 12 of the camera 1 executes the release routine shown in FIGS. 7A and 7B when the switch 37, i.e., the release starting switch, becomes closed (point a in FIG. 6).

At #1, electric power is supplied to the leading and trailing shutter magnets and at #2, driving means, not shown, is driven to start mirror-up (point b in FIG. 6). At #3, it is waited for the switch 35, i.e., the switch for informing of the completion of mirror-up, to become closed, and when this switch is closed (point c in FIG. 6), at #4, D/A conversion is executed to apply the same predetermined voltage to all of the five gain setting voltage input terminals VG1-5 of the photometry/light adjusting circuit 11 (point d in FIG. 6). Thereafter, at #5, time counting is started by a timer TMR for measuring time and at #6, the output port P1 is rendered into L to render ITG into L as an integration starting signal to the photometry/light adjusting circuit 11 (point e in FIG. 6). At the same time, at #7, the port P4, i.e., the contact B3, is rendered into L to cause the electronic flashing device 101 to effect one shot of preliminary flashing of a predetermined unit quantity of light. Thereby, the electronic flashing device 101 effects preliminary flashing of a predetermined quantity of light as shown by the waveform of flashing immediately after the point e in the timing chart of FIG. 6. At #8, the microcomputer 12 waits for 100μs in preparation for the start of the next preliminary flashing, and at #9, it once returns the port P4, i.e., the contact B3, to H. At #10, the microcomputer again waits for 100 μs, and then at #11, it judges the level of the input port P2. This judges whether in the photometry/light adjusting circuit 11, the integrated voltage of the integrating capacitor of the sum total of the quantities of light of all divided areas has reached a predetermined value and STOP signal has been output. When here, the level of the port P2 is not H, that is, the integrated voltage has not reached the predetermined value, return is made to #7, where the triggering of the next preliminary flashing is effected at a time interval of 200 μs, but if the level of the port P2 is L, that is, the integrated voltage has reached the predetermined value, advance is made to #12. The operation here is for the purpose of effecting preliminary flashing repetitively until the integrated voltage of each divided area assumes such a suitable level that it does not overflow relative to the voltage range of A/D conversion when the integrated voltage is A/D-converted later.

The circuit operation of the photometry/light adjusting circuit 11 in the meantime will now be described.

The light receiving elements PD11-51 of the photometry/light adjusting circuit 11 catch the object field reflected light and output photocurrents proportional to the magnitude thereof. Describing the circuit operation after this with respect to a first channel associated with PD11, the photocurrent produced by PD11 is converted into a voltage output logarithmically compressed by the operational amplifier A11 and feedback diode D11, and is again converted into a current output logarithmically expanded by the transistors Q11 and Q12 using this potential as their emitters and the potential of the gain setting voltage input VG1 as their bases, and after all, the collector currents of the transistors Q11 and Q12 are amplified by again determined by the potential of VG1 while keeping proportional relations with the photocurrent, and exhibit an output current waveform similar to the waveform of flashing shown in FIG. 6. The collector current of the transistor Q12 is converted into a source current of the same value by the current mirror circuit comprising Q13 and Q14, and this current charges the capacitor C11 liberated from its short-circuited state by the falling of ITG signal. The charging voltage of the capacitor C11 is converted into a voltage output of low impedance by a buffer amplifier A12 and is output from V02 output terminal. This output voltage rises as shown by the waveform of V01 immediately after the point e in the timing chart of FIG. 6, and this integrate the photocurrent amplified by a predetermined gain and represents it in the form of a voltage of GND standard. With regard also to the second and subsequent channels, the circuit operation itself is similar with the exception that the quantity of object field reflected light varies independently. The five transistors Q11–Q51 have their gains made constant by applying the same voltage to VG1-5 in advance and therefore, output currents obtained by the photocurrent being amplified by the same gain, and these are parallel-connected together and C1 is charged with a current obtained by the sum total of the photocurrents of the respective channels being amplified. The terminal voltage of C1 varies as shown by the waveform of the C1 integrated voltage in the timing chart of FIG. 6, and when this voltage becomes lower than the reference voltage E2, the comparator CP1 reverses the output and the terminal STOP turns from H to L (point f in FIG. 6).

When preliminary flashing and the integrating and reading operation are terminated in the manner described above, at #12, the value of the timer TMR is transferred to and stored in a memory TR1. This time is the time for which the object field light has been integrated while preliminary flashing is effected. Subsequently, at #13, the voltages of the terminals AD1-5 of the microcomputer 12 which are integrated voltages of the divided areas of the photometry/light adjusting circuit 11 are A/D-converted, and the results are stored in memories G1-5. At #14, the port P1 is restored to H (point g in FIG. 6), and the charges in each integrating capacitor of the photometry/light adjusting circuit 11 are discharged. At #15, the microcomputer waits for 100 μs, and then at #16, the time counting by the timer TMR is again started from 0, and at #17, the port P1, i.e., ITG of the photometry/light adjusting circuit 11, is rendered into L (point h in FIG. 6), and the integrating operation is started again. At #18, the substance of the timer TMR which varies with time is compared with the substance stored in the memory TP1, and at a point of time whereat they coincide with each other, advance is made to #19, where the voltages of the terminals AD1-5 of the microcomputer 12 which are the integrated voltages of the divided areas of the photometry/light adjusting circuit 11 are A/D-converted, and the results are stored in memories H1-5. At #20, the port P1 is restored to H (point i in FIG. 6), and the charges in each integrating capacitor of the photometry/light adjusting circuit 11 are discharged. The series of operations of #16–#20 mean that the integrating operation is again performed without preliminary flashing being effected for just the same time as that for the integration effected while the previous preliminary flashing is effected, and the result of this is the stationary light component in each divided area. In the timing chart of FIG. 6, the time tP1 from point e to point g and the time tP2 from point h to point i are controlled so as to become entirely the same.

Subsequently, at #21, subtraction is effected between the substances of memories G1-5 and the substances of memories H1-5, and the results are stored in memories I1-5. The substances of these memories I1-5 are the object field reflected light distribution information by the contribution of only the flashlight illumination of the electronic flashing device. At #22, the result is input to a predetermined multi-pattern calculation algorithm, and the degree of weighting to each divided area during the main flashing for photographing. With regard to the substance of this multi-pattern calculation algorithm, for example, what is disclosed in the aforementioned U.S. application Ser. No. 560,745 is supposed, but it is not directly concerned with the gist of the present invention and therefore need not be described. When the multi-pattern calculation is terminated, at #23, the D/A conversion of the five channels is executed to apply to terminals VG1-VG5 the gain setting voltages for the respective channels with the degree of weighting to each divided area which was found at #22 being reflected thereon and with the adjustment of the gain for the film speed taken into consideration (point j in FIG. 6). Thereby, with respect to the divided areas higher in weighting, setting is effected so that a current enhanced in amplification factor may be integrated. Subsequently, at #24, the power supply to the leading shutter magnet 31 is stopped to start the actual shutter release operation (point k in FIG. 6), and the leading shutter curtain starts to move. At #25, the closing of the switch 36 after the shutter has become fully open is waited for, and when this switch is closed (point m in FIG. 6), at #26, the output port P1 is immediately rendered into L to thereby permit the integrating operation of the photometry/light adjusting circuit 11 and also, the port P3, i.e., the contact B2, is rendered into L to thereby command the electronic flashing device 101 to start main flashing. The light emitting portion 111 of the electronic flashing device 101 raises its light emission as shown by the waveform of flashing in FIG. 6.

The light adjusting operation by the photometry/light adjusting circuit 11 is performed as shown by the waveform of each portion from point m to point n in FIG. 6. In the photometry/light adjusting circuit 11, the sum total of expanded currents with the weighting of Q11-Q51 taken into account charges the integrating capacitor C1. When this exceeds the predetermined reference voltage E2, the STOP terminal turns from H to L and commands the flashing control circuit 112 of the electronic flashing device 101 through the contact B1 to stop the main flashing, and the light emitting portion 111 stops flashing (point n in FIG. 6).

At this point of time, exposure with the flashing device as the light source is terminated. The program of the microcomputer 12 counts the time from after the power supply to the leading shutter magnet is stopped at #27, and at a point of time whereat the set shutter time has passed, the power supply to the trailing shutter magnet 32 is stopped at #28 (point o in FIG. 6). Also, on the spot, at #29, the terminals of the output ports P1 and P3 are restored to H, thus becoming ready for the release operation for the next frame. Thereafter, when shutter charge drive means, mirror-down drive means, etc., not shown, are driven, the switches related to respective sequences restore their original OFF state at point q in FIG. 6. Thus, the operation during the shutter release is terminated.

Figures 8, 8A:
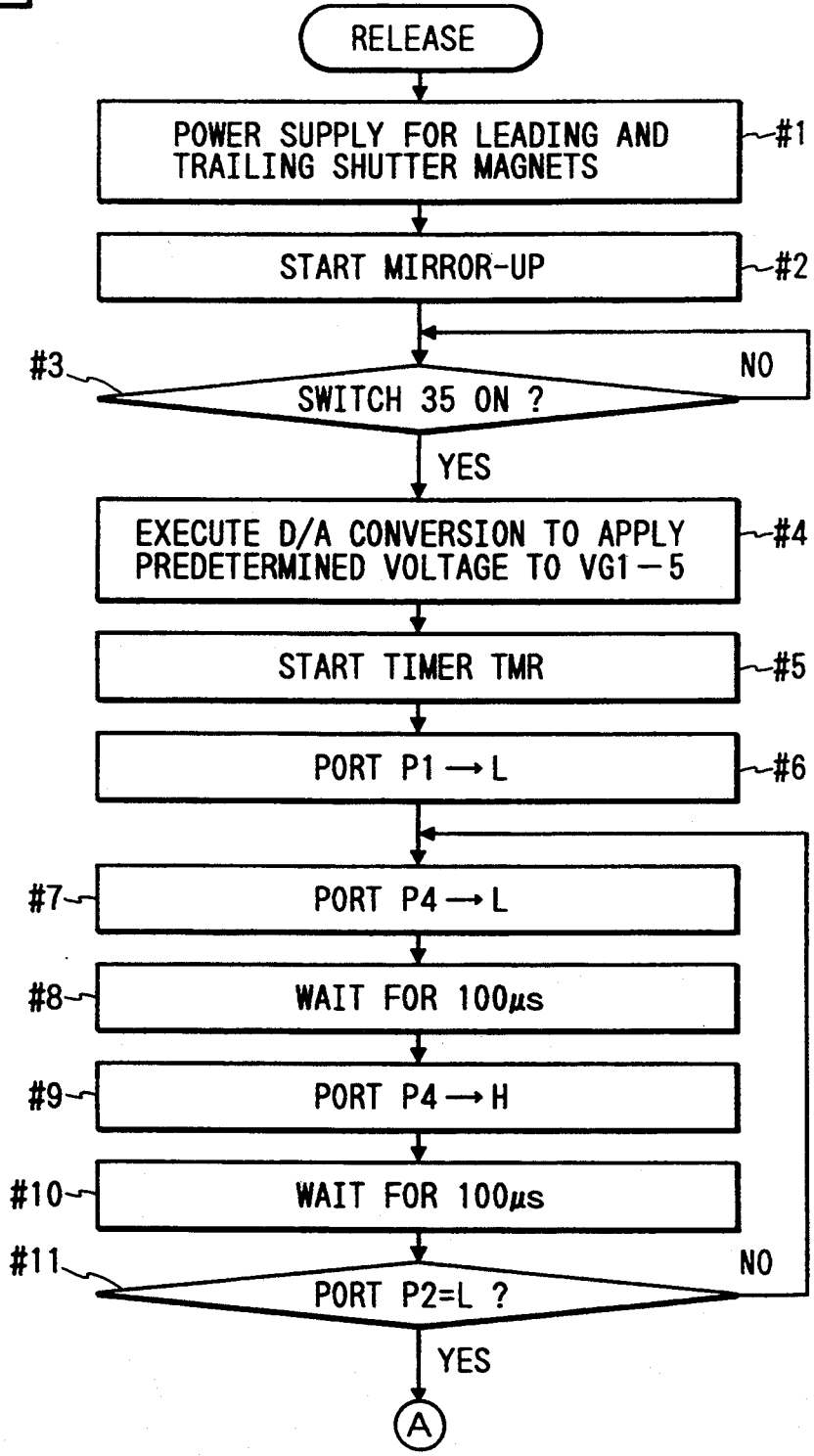
FIG. 8 is comprised of FIG. 8A and FIG. 8B showing flow charts showing the operation of the embodiment of the present invention.
Figure 8B:
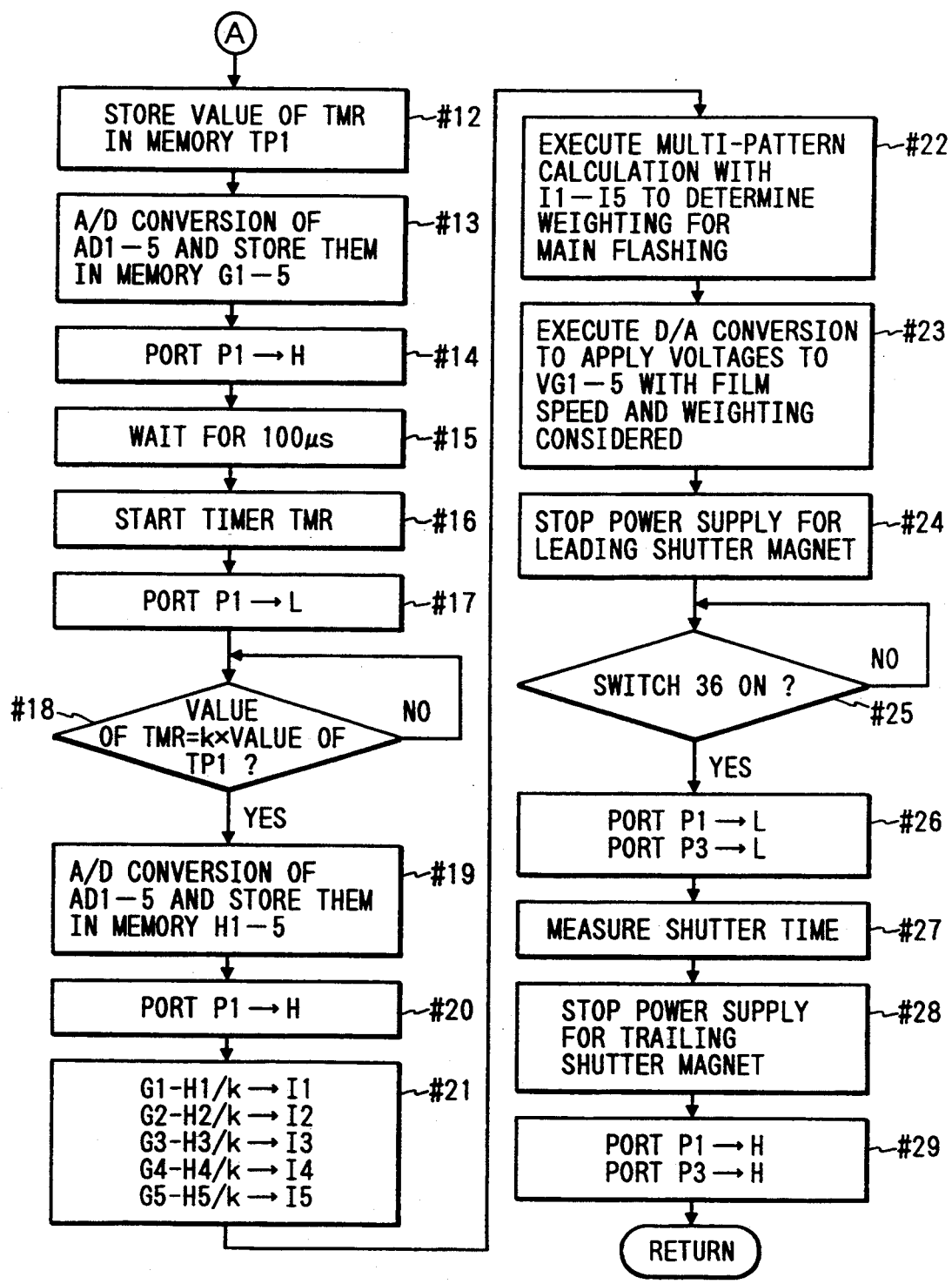

FIGS. 8A and 8B are flow charts showing a developed form of the operation of the microcomputer 12 in the embodiment of the present invention. The difference of FIGS. 8A and 8B from FIGS. 7A and 7B is that at #18 and #21, a predetermined coefficient k is introduced. At #18, the integration time without preliminary flashing is controlled to a value obtained by the integration time when preliminary flashing is effected (the substance of the memory TP1) being multiplied by k. At #19, a value integrated for that time is stored in a memory, and the cancellation of the stationary light component at #21 is effected by subtracting a value obtained by the value integrated without preliminary flashing being divided by the coefficient k, from the value integrated with preliminary flashing effected. That is, by the utilization of the nature that the integrated value of the stationary light is proportional to the integration time, instead of making the second integration time different from the first integration time, the calculation for the cancellation of the stationary light is effected with the ratio between the two integration times being conversely corrected. The following two forms of the application of this would occur to mind.

One is a case where the value of k is made small, and in such case, the second integration time may be short and the time required for the entire sequence can be made short.

The other is a case where conversely, the value of k is made great. If as in the case of the control of the flow of FIGS. 7A and 7B, the first and second integration times are made the same, the second integrated value becomes smaller without fail and the integrated value may lie too much toward the lower portion of the range of A/D conversion and S/N may become bad. So, if k is made great, the integration output value will also become great and can be raised to a level suitable for A/D conversion.

Of course, on the other hand, the above-described two forms have their respective demerits, but the degree of freedom to which the value of k can be selected in a more important direction in conformity with the convenience of design of each camera can be increased.

According to the present invention, when detecting the object field reflected light distribution information by the preliminary flashing necessary for TTL multiple-flash control, integration is effected with the preliminary flashing and immediately thereafter, integration is effected without the preliminary flashing, and those two integrations are effected with the optical systems and sensors made just the same and moreover with the integration times made just the same, and the stationary light component is cancelled by the difference between the two integrations and therefore, it becomes possible to find the object field reflected light distribution by the contribution of only the flashlight illumination with very high accuracy. Accordingly, ideal information can be given to the multi-pattern algorithm for finding the weighting of each divided area during the subsequent main flashing, and the accuracy of flash control can be enhanced.

The present invention also has a degree of freedom as a specific technique whereby the equilibrium of the time required for sequence and the detection accuracy can be freely adjusted, because two integration times are intentionally controlled to different times and the difference between those integration times can be corrected by calculation during the calculation of the cancellation of the stationary light.

What is claimed is:

1. A TTL auto flash control device for a camera capable of effecting TTL multiple-flash control in which preliminary flashing is effected before exposure and the quantity of flashlight of main flashing during exposure is controlled on the basis of the result of the detection of the reflected light distribution information of the object field, comprising:

preliminary flashing control means for controlling the preliminary flashing;

divisional photometry integrating means for photometering the light of a plurality of divided areas in a photographing area, producing a plurality of photometric outputs and integrating said plurality of photometric outputs with respect to time;

integration control means for controlling a first integration sequence in which prior to the exposure of film, said preliminary flashing control means is operated to thereby obtain a first integration result of said divisional photometry integrating means, and a second integration sequence in which subsequently, said preliminary flashing control means is not operated to thereby obtain a second integration result of said divisional photometry integrating means;

information determining means for determining information for the main flashing control on the basis of said first integration result and said second integration result; and integration time measuring means for measuring the time for which in said first integration sequence, said divisional photometry integrating means effects integration;

wherein said integration control means controls the integration time of said divisional photometry integrating means in said second integration sequence on the basis of the integration time measured by said integration time measuring means.

2. A TTL auto flash control device according to claim 1, wherein said information determining means determines the information for the main flashing control on the basis of a value obtained by the value of said second integration result being subtracted from the value of said first integration result.

3. A TTL auto flash control device according to claim 2, wherein said integration control means controls the integration time of said divisional photometry integrating means in said second integration sequence so as to be equal to the integration time measured by said integration time measuring means.

4. A TTL auto flash control device according to claim 1, wherein said information determining means determines the information for the main flashing control on the basis of a value obtained by a value obtained by the value of said second integration result being divided by a predetermined value being subtracted from the value of said first integration result.

5. A TTL auto flash control device according to claim 4, wherein said integration control means controls the integration time of said divisional photometry integrating means in said second integration sequence so as to be equal to a time obtained by the integration time measured by said integration time measuring means being multiplied by said predetermined value.

6. A TTL auto flash control device according to claim 1, wherein said preliminary flashing control means stops the preliminary flashing on the basis of the output of said divisional photometry integrating means.

7. A TTL auto flash control device for a camera capable of effecting TTL multiple-flash control in which preliminary flashing is effected before an exposure and the quantity of flashlight of main flashing during the exposure is controlled on the basis of the result of the detection of the reflected light distribution information of the object field, comprising:

a divisional photometry integrating circuit to photometer the light of a plurality of divided areas in a photographing area, produce a plurality of photometric outputs and integrate said plurality of said photometric outputs with respect to time; and a control circuit to control a first and a second integration sequence of said divisional photometry integrating circuit prior to the exposure so that said preliminary flashing is effected during said first integration sequence and is not effected during said second integration sequence, and to determine information for the main flashing control on the basis of the results of said first and second integration sequences, said control circuit measuring the time of said first integration sequence and controlling the time of said second integration sequence on the basis of the measured time of said first integration sequence.

8. A TTL auto flash control device according to claim 7, wherein said control circuit determines the information for the main flashing control on the basis of a value obtained by the value of a result of said second integration sequence being subtracted from the value of a result of said first integration sequence.

9. A TTL auto flash control device according to claim 7, wherein said control circuit controls said divisional photometry integrating circuit so that the time of said second integration sequence is equal to the time of said first integration sequence measured by said control circuit.

10. A TTL auto flash control device according to claim 7, wherein said control circuit stops the preliminary flashing on the basis of the output of said divisional photometry integrating circuit.

* * * * *